(12) United States Patent
Cho et al.

(10) Patent No.: US 11,739,832 B2
(45) Date of Patent: Aug. 29, 2023

(54) SHIFT BY WIRE SYSTEM

(71) Applicants: Hyundai Motor Company, Seoul (KR); Kia Motors Corporation, Seoul (KR); SL Corporation, Daegu (KR)

(72) Inventors: Yang Rae Cho, Suwon-si (KR); Wonjin Jeong, Hwaseong-si (KR); Chang Su Lee, Daegu (KR)

(73) Assignees: Hyundai Motor Company, Seoul (KR); Kia Motors Corporation, Seoul (KR); SL Corporation, Seoul (KR)

( * ) Notice: Subject to any disclaimer, the term of this patent is extended or adjusted under 35 U.S.C. 154(b) by 336 days.

(21) Appl. No.: 17/082,352

(22) Filed: Oct. 28, 2020

(65) Prior Publication Data

US 2021/0317911 A1    Oct. 14, 2021

(30) Foreign Application Priority Data

Apr. 9, 2020   (KR) .......................... 10-2020-0043353

(51) Int. Cl.
| | |
|---|---|
| *F16H 59/10* | (2006.01) |
| *F16H 61/02* | (2006.01) |
| *F16H 61/00* | (2006.01) |
| *F16H 59/12* | (2006.01) |
| *F16H 59/08* | (2006.01) |

(52) U.S. Cl.
CPC ......... *F16H 61/0204* (2013.01); *F16H 59/10* (2013.01); *F16H 59/12* (2013.01); *F16H 61/0006* (2013.01); *F16H 2059/081* (2013.01)

(58) Field of Classification Search
CPC .. F16H 61/0204; F16H 61/0006; F16H 61/32; F16H 61/0003; F16H 59/10; F16H 59/12; F16H 2059/081; F16H 2063/005; F16H 2704/04; F16H 2708/22; F16H 2061/326
USPC ............................ 361/752; 312/223.1, 223.2
See application file for complete search history.

(56) References Cited

U.S. PATENT DOCUMENTS

| | | | | |
|---|---|---|---|---|
| 4,519,266 A | * | 5/1985 | Reinecke | F16H 59/044 335/206 |
| 4,734,861 A | * | 3/1988 | Bertolasi | F16H 59/00 701/67 |
| 6,173,622 B1 | * | 1/2001 | Carnevale | F16H 59/02 74/473.18 |
| 7,291,023 B1 | * | 11/2007 | Still | G01D 11/245 439/67 |
| 7,421,923 B2 | * | 9/2008 | Kim | F16H 63/42 74/473.18 |
| 9,505,387 B2 | * | 11/2016 | Tanigaki | B60T 7/045 |

(Continued)

FOREIGN PATENT DOCUMENTS

KR    101714267 B1 * 3/2017

*Primary Examiner* — T. Scott Fix
(74) *Attorney, Agent, or Firm* — MORGAN, LEWIS & BOCKIUS LLP (57) ABSTRACT

A shift by wire system may include a shifter assembly that is configured to generate an electrical manipulation signal by a driver's shifting operation, a shifter controller provided in the shifter assembly and configured of transmitting shift information according to the electrical manipulation signal, and an actuator controller which is mounted on a housing coupled with the shifter assembly, connected to the shifter controller, and applies a driving signal according to the shift information to an actuator.

12 Claims, 10 Drawing Sheets

(56) References Cited

U.S. PATENT DOCUMENTS

| | | | |
|---|---|---|---|
| 2008/0041180 A1* | 2/2008 | Cho .................... | F16H 59/105 74/473.1 |
| 2010/0242656 A1* | 9/2010 | Kino .................... | F16H 59/10 74/473.12 |
| 2017/0240164 A1* | 8/2017 | Gaviani ................ | B60K 20/04 |
| 2020/0062113 A1* | 2/2020 | Otoguro ............... | B60K 20/04 |

* cited by examiner

SHIFT BY WIRE SYSTEM

CROSS-REFERENCE TO RELATED APPLICATION

The present application claims priority to Korean Patent Application No. 10-2020-0043353 filed on Apr. 9, 2020, the entire contents of which is incorporated herein for all purposes by this reference.

BACKGROUND OF THE INVENTION

Field of the Invention

The present invention relates to a shift by wire system. More particularly, the present invention relates to a shift by wire system (SBW) as an electronic transmission system.

Description of Related Art

In general, an electronic transmission (Shift By Wire, SBW) system (hereinafter, referred to as an SBW system for convenience) implements transmission control by an electrical signal.

The SBW system converts the shift signal according to the driver's shifting operation into an electrical signal, drives the actuator as the electrical signal, and performs transmission shifting.

Conventionally, an electronic shifter type SBW system has been developed that drives an actuator by pressing an operation button portion by a driver.

Such an electronic shifter type SBW system has an electronic shifter controller that converts a shift signal according to the operation of an operation button into an electrical signal, and an actuator controller that receives shift information from the electronic shifter controller and controls the actuator.

Furthermore, conventionally, the operation button unit and the electronic shifter controller are configured as one assembly, the actuator controller is configured as another assembly, and these assemblies are connected to a hard wire.

However, in the related art, each of the above-described assemblies is separately configured, and as these assemblies are connected to a hard wire, there is a risk of wire damage due to external environmental conditions, and communication between controllers may be blocked and responsiveness may deteriorate.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift by wire system in which two or more controllers that drive an actuator by processing an operation signal according to a shift operation of a driver are integrated into a single assembly.

A shift by wire system according to various exemplary embodiments of the present invention may include a shifter assembly that is configured to generate an electrical manipulation signal by a driver's shifting operation, a shifter controller provided in the shifter assembly and configured of transmitting shift information according to the electrical manipulation signal, and an actuator controller which is mounted on a housing coupled with the shifter assembly, connected to the shifter controller, and applies a driving signal according to the shift information to an actuator.

The shifter controller may be coupled to an interior of the shifter assembly, and the actuator controller is coupled to an interior of the housing separately from the shifter controller, and the shifter controller may be connected to the actuator controller through a connector.

The actuator controller may be connected to the actuator through a connection cable.

A shift by wire system according to various exemplary embodiments of the present invention may include an upper housing, a control panel which is coupled to an upper portion of the upper housing and is configured to generate an electrical manipulation signal by a driver's shifting operation, a shifter controller provided inside the upper housing and configured of transmitting shift information according to the electrical manipulation signal, a middle housing coupled to the lower portion of the upper housing through its upper portion, an actuator controller which is connected to the shifter controller inside the middle housing and applies a driving signal according to the shift information to the actuator, and a lower cover coupled to a lower portion of the middle housing.

The shifter controller may be connected to an internal portion of the upper housing through a connecting bracket.

The middle housing may be in a form with an upper portion closed and a lower portion opened, and the shifter controller may be connected to the actuator controller through a connector assembly that passes through the middle housing.

The actuator controller may include a first control board connected to the shifter controller through a first connector penetrating the middle housing, and a second control board connected to the first control board through a second connector.

In the internal portion of the middle housing, a plurality of connecting ribs fitted into a plurality of connecting grooves provided in an edge portion of the first control board may be formed, and a plurality of connecting boss coupled with the second control board may be formed.

The first control board may be provided with a connection socket which may be electrically connected to the actuator.

The lower cover may have a cover hole connected to the connection socket, and the connection socket may be connected to the connection cable through the cover hole, wherein the connection cable may be connected to the actuator.

A plurality of connection protrusions may be formed at the upper edge portion of the middle housing, and in a lower edge portion of the upper housing, a plurality of connection holes coupled with the plurality of connection protrusions may be formed.

A plurality of hook protrusions may be formed at the edge portion of the lower cover, and in the lower edge portion of the middle housing, a plurality of hook holes that are coupled to the hook protrusion may be formed.

The control panel may include a plurality of control buttons.

The control panel may include a gear knob.

The control panel may include a rotation knob.

According to various exemplary embodiments of the present invention, by integrating the shifter controller and actuator controller into a single assembly of the upper housing and middle housing, it is possible to reduce the number of portions and weight, and potential failure causes such as wire breakage due to external environmental conditions and blocking communication between controllers may be eliminated.

Furthermore, the effects obtained or predicted due to various exemplary embodiments of the present invention will be included directly or implicitly in the detailed description of various exemplary embodiments of the present invention. That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clearly describe the present invention, portions irrelevant to the description are omitted, and the same reference numerals are attached to the same or similar components throughout the specification.

Since the sizes and thicknesses of each component shown in the drawings are arbitrarily shown for convenience of description, the present invention is not necessarily limited to those shown in the drawings, and the thicknesses are enlarged to clearly express various portions and regions.

Furthermore, in the following detailed description, the names of the configurations are divided into first, second, etc. to distinguish the configurations in the same relationship, and are not necessarily limited to the order in the following description.

Throughout the specification, when a portion includes a certain component, it means that other components may be further included rather than excluding other components unless stated to the contrary.

Furthermore, terms such as, unit, means, part, member, etc. described in the specification mean a unit of a comprehensive constitution that performs at least one function or operation.

Figure 1:
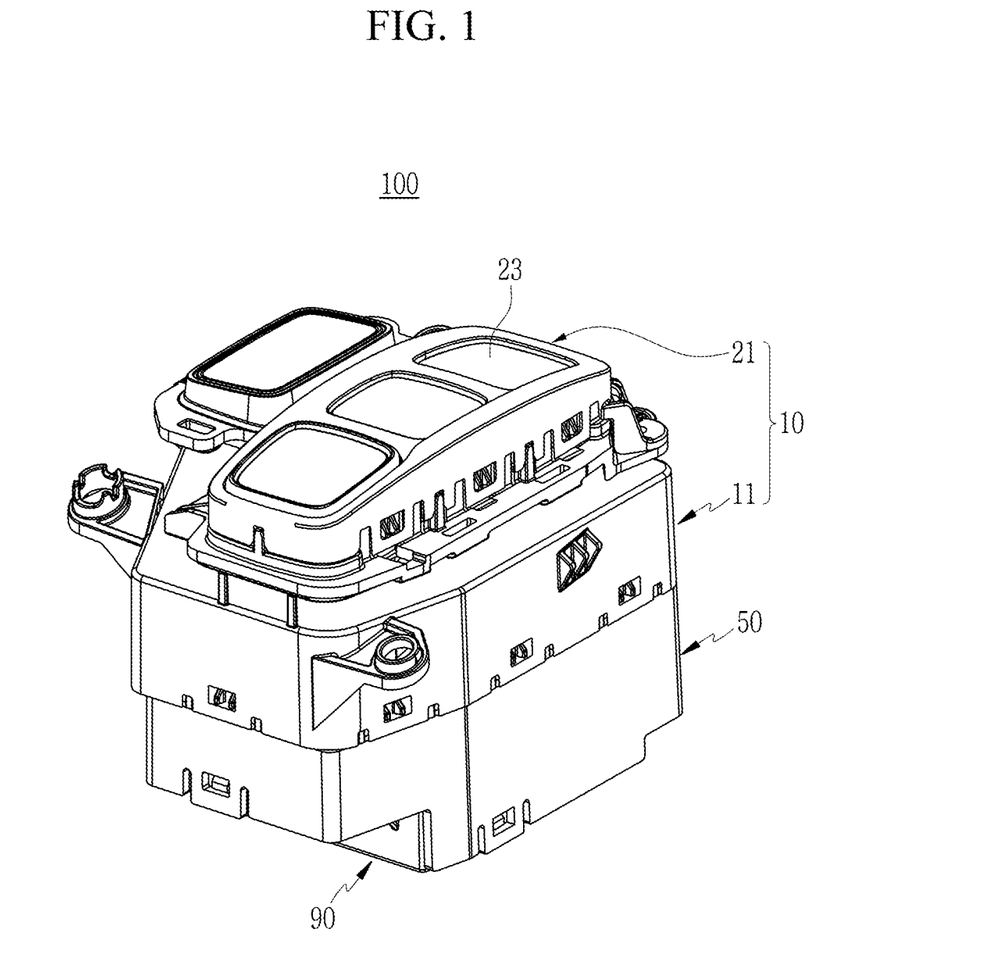
FIG. 1 is a perspective view showing a shift by wire system according to various exemplary embodiments of the present invention.
Figure 2:
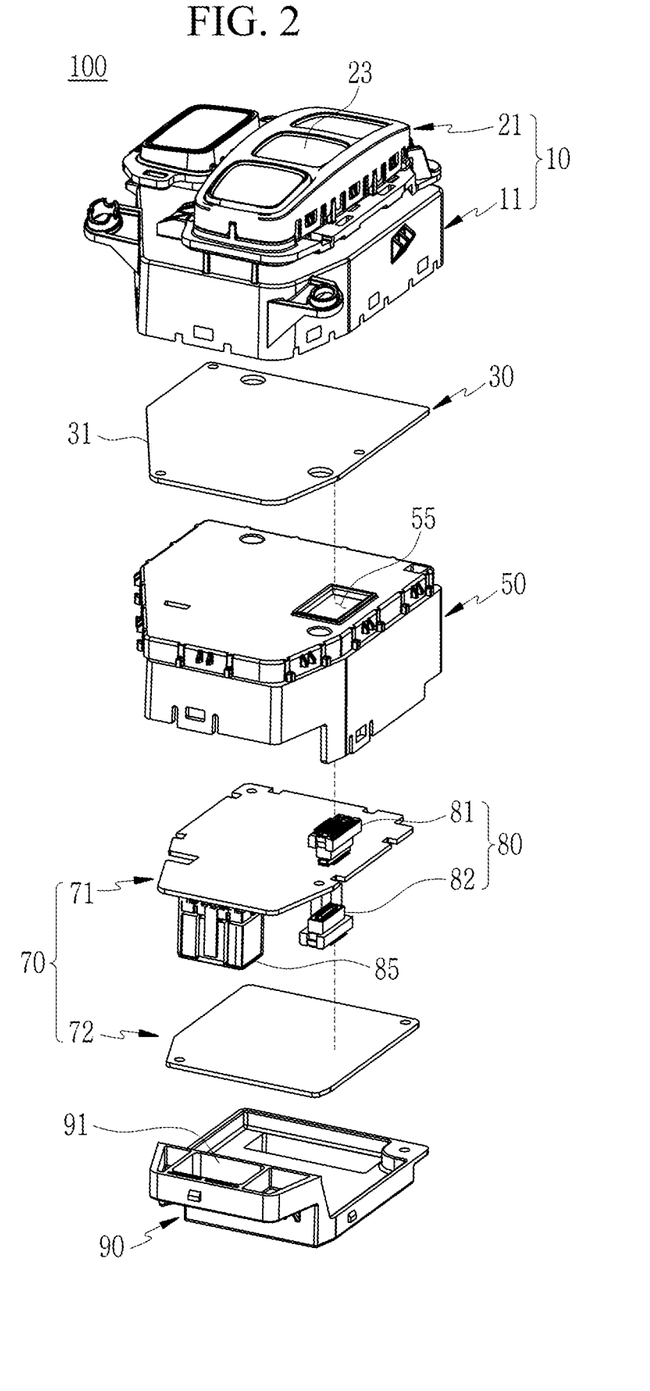
FIG. 2 and FIG. 3 is an exploded perspective view showing a shift by wire system according to various exemplary embodiments of the present invention.
Figure 3:
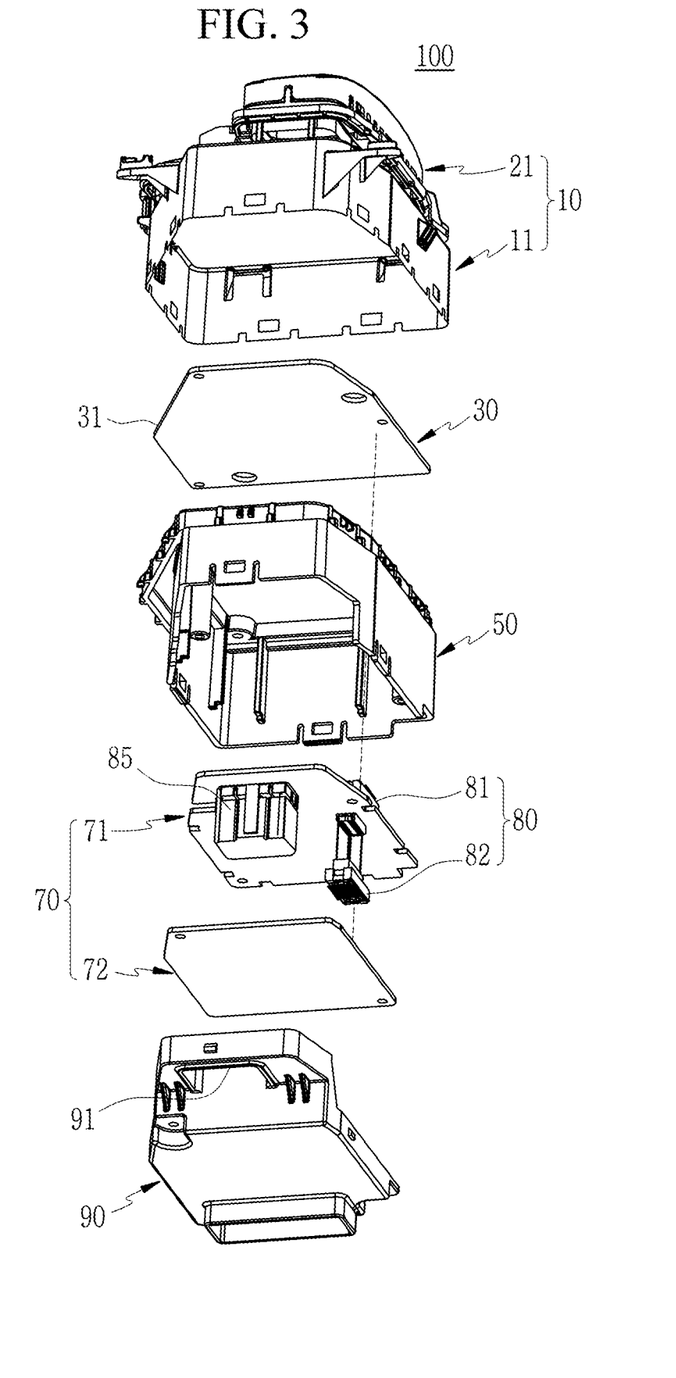
Figure 4:
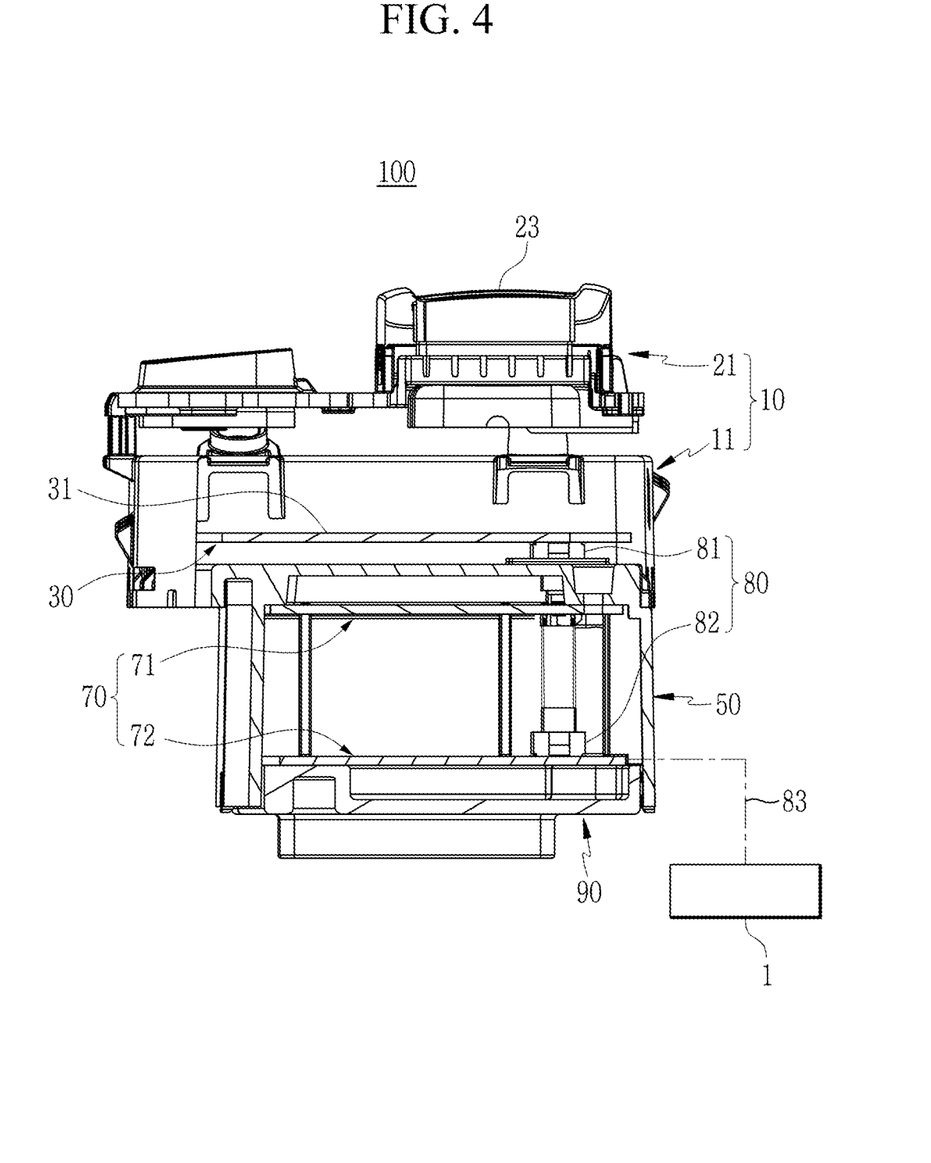
FIG. 4 is a cross-sectional view showing a shift by wire system according to various exemplary embodiments of the present invention.

FIG. 1 is a perspective view showing a shift by wire system according to various exemplary embodiments of the present invention, FIG. 2 and FIG. 3 is an exploded perspective view showing a shift by wire system according to various exemplary embodiments of the present invention, and FIG. 4 is a cross-sectional view showing a shift by wire system according to various exemplary embodiments of the present invention.

Referring to FIG. 1, FIG. 2, FIG. 3, and FIG. 4, a shift by wire system 100 according to various exemplary embodiments of the present invention is an electronic transmission and is also referred to as an SBW system. Hereinafter, the shift by wire system is referred to as the SBW system for convenience.

The SBW system transmits a shift signal (manipulation signal) according to the driver's shift operation as an electrical signal to the shift controller, drives the actuator as the electrical signal, and can change the shift ranges of the transmission.

In the SBW system, the actuator decelerates the high-speed rotation of the driving body to low-speed rotation and outputs it, and the output side is connected to a manual shaft to control the shifting mode of the transmission.

Hereinafter, based on the drawing, the portions facing the upper side are referred to as upper, upper side, lower portions or upper portions, and the portions facing the lower side are referred to as the lower, lower side, lower portions and lower portions.

Furthermore, the end portion (one/one end portion or the other/one end portion) in the following may be defined as an end portion and it may be defined as a portion (one/one end portion or the other/one end portion) that includes the end portion.

The SBW system 100 according to various exemplary embodiments of the present invention has a structure in which two or more controllers that drive an actuator by processing a manipulation signal according to a driver's shift operation are integrated into a single assembly.

The SBW system 100 according to various exemplary embodiments of the present invention basically includes a shifter assembly 10, a shifter controller 30, a middle housing 50, an actuator controller 70, and a lower cover 90.

In various exemplary embodiments of the present invention, the shifter assembly 10 is for generating an electrical manipulation signal by a shift operation of a driver, and is mounted on one side of the driver's seat in the vehicle. The present shifter assembly 10 includes an upper housing 11 and a control panel 21.

The upper housing 11 is mounted on one side of the driver's seat in the vehicle. The upper housing 11 forms an internal space with an upper closed and a lower open. The control panel 21 generates an electrical manipulation signal by the driver's shifting operation, and is coupled to an upper portion of the upper housing 11.

The control panel 21 may include a plurality of control buttons 23 for generating an electrical manipulation signal for shifting (change) by pressing operation of a driver.

In various exemplary embodiments of the present invention, the shifter controller 30 acquires the electrical manipulation signal input through the control panel 21 and transmits shift information according to the electrical manipulation signal, and is provided in the upper housing 11 of the shifter assembly 10.

Figure 5:
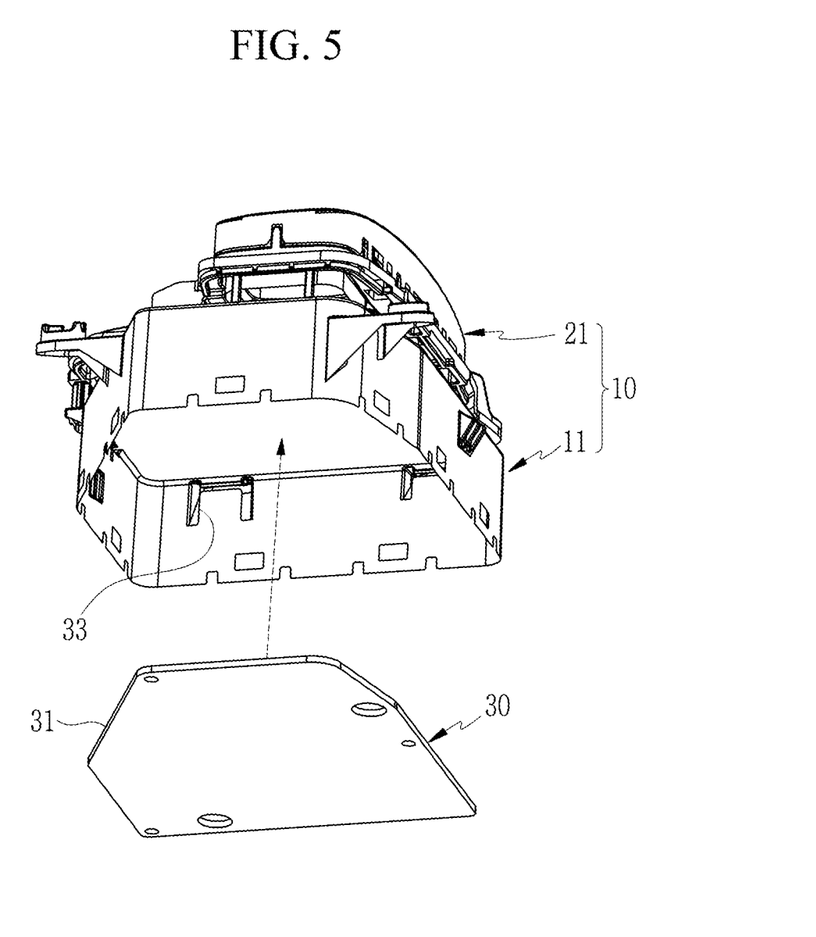
FIG. 5 is a perspective view of a shifter controller applied to a shift by wire system according to various exemplary embodiments of the present invention.

The shifter controller 30 includes a main control board 31 which is coupled inside the upper housing 11. The main control board 31, as shown in FIG. 5, may be coupled to an internal portion of the upper housing 11 through a connecting bracket 33.

In various exemplary embodiments of the present invention, the middle housing 50 forms an internal space in which an upper portion is closed and a lower portion is open. The middle housing 50 is coupled to a lower portion of the upper housing 11 through an upper portion. That is, the upper housing 11 and the middle housing 50 may be provided as a single assembly combined with each other.

Figure 6:
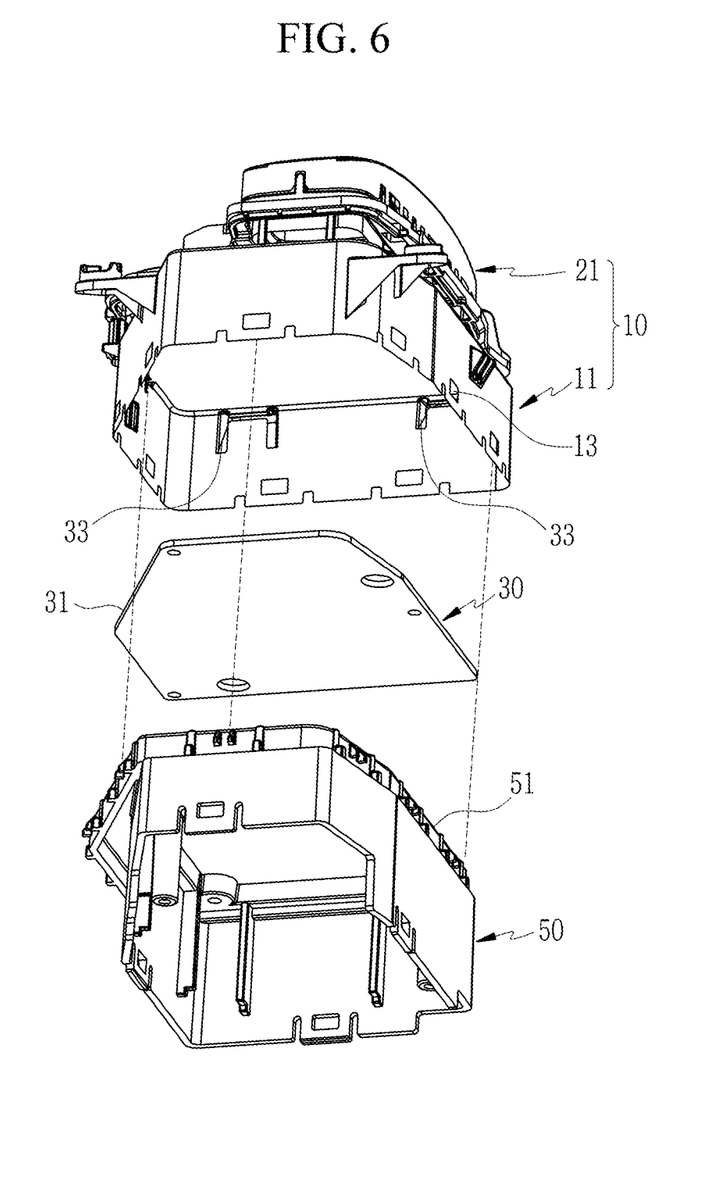
FIG. 6 is a perspective view of an upper housing and a middle housing applied to a shift by wire system according to various exemplary embodiments of the present invention.

As shown in FIG. 6, a plurality of connection protrusions 51 is formed at an upper edge portion of the middle housing 50. Furthermore, a plurality of connection holes 13 coupled to the connection protrusions 51 are formed at a lower edge portion of the upper housing 11.

In various exemplary embodiments of the present invention, the actuator controller 70 acquires shift information transmitted from shifter controller 30 and applies a drive signal according to the shift information to an actuator 1.

Here, the actuator 1 is a well-known actuator for SBW known in the art, and is provided separately from a single assembly of upper housing 11 and middle housing 50.

For example, the actuator 1 may include a drive motor, a sun gear eccentrically coupled to a driveshaft rotated by the drive motor, a fixed ring gear that can engage the sun gear, and an output shaft coupled to the sun gear. The detailed configuration and operation of the actuator 1 is obvious to a person skilled in the art, and a detailed description thereof will be omitted.

The actuator controller 70 is mounted inside the middle housing 50 and may be connected to the shifter controller 30. The actuator controller 70 may be mounted inside the middle housing 50 independently of the shifter controller 30. The actuator controller 70 may be connected to the shifter controller 30 through a connector assembly 80 including a first connector 81 and a second connector 82.

For example, a middle housing hole 55 may be formed in the middle housing 50, and the first connector 81 may be connected to the shifter controller 30 through the middle housing hole 55.

The shifter controller 30 and actuator controller 70 are connected to each other through the connector assembly 80 that passes through the middle housing 50. The shifter controller 30 is mounted on an upper portion of the middle housing 50 and internal to the upper housing 11, and is connected to the actuator controller 70 inside the middle housing 50 through the connector assembly 80.

The actuator controller 70 may include a first control board 71 and a second control board 72 as a motor control unit (MCU) and SBW control unit (SCU).

The first control board 71 is connected to the shifter controller 30 through the first connector 81 penetrating the middle housing 50 and the second control board 72 is connected to first control board 71 through the second connector 82.

Figure 7:
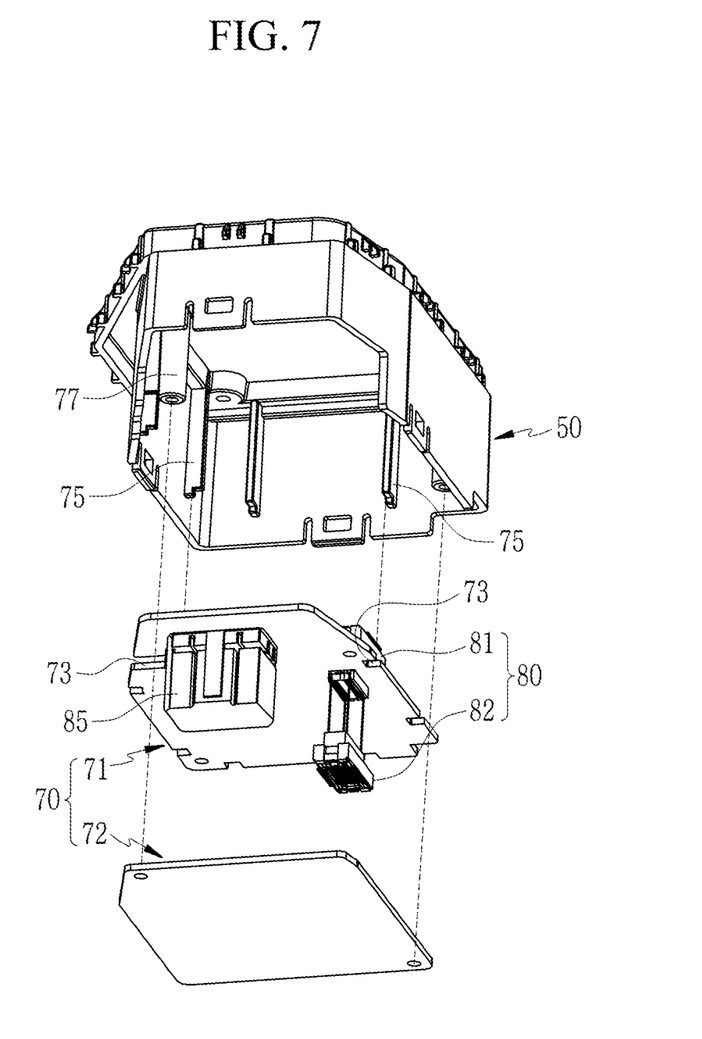
FIG. 7 is a perspective view of an actuator controller applied to a shift by wire system according to various exemplary embodiments of the present invention.

The first and second control boards 71 and 72 described above are attached to the internal portion of the middle housing 50. As shown in FIG. 7, the internal portion of the middle housing 50 is formed with a plurality of connecting ribs 75 fitted to a plurality of connecting grooves 73 provided at an edge portion of the first control board 71. A plurality of connecting bosses 77 are formed on the internal portion of the middle housing 50 to be coupled to the second control board 72.

The first control board 71 of the actuator controller 70 is provided with a connection socket 85 which may be electrically connected to the actuator 1 through a connection cable 83 (see FIG. 4).

In various exemplary embodiments of the present invention, the lower cover 90 closes the lower portion of the middle housing 50, and is coupled to the lower portion of the middle housing 50.

In the lower cover 90, a cover hole 91 which is connected to the connection socket 85 mentioned above is formed. That is, the connection socket 85 is connected to the connection cable 83 through the cover hole 91, and the connection cable 83 is connected to the actuator 1.

Figure 8:
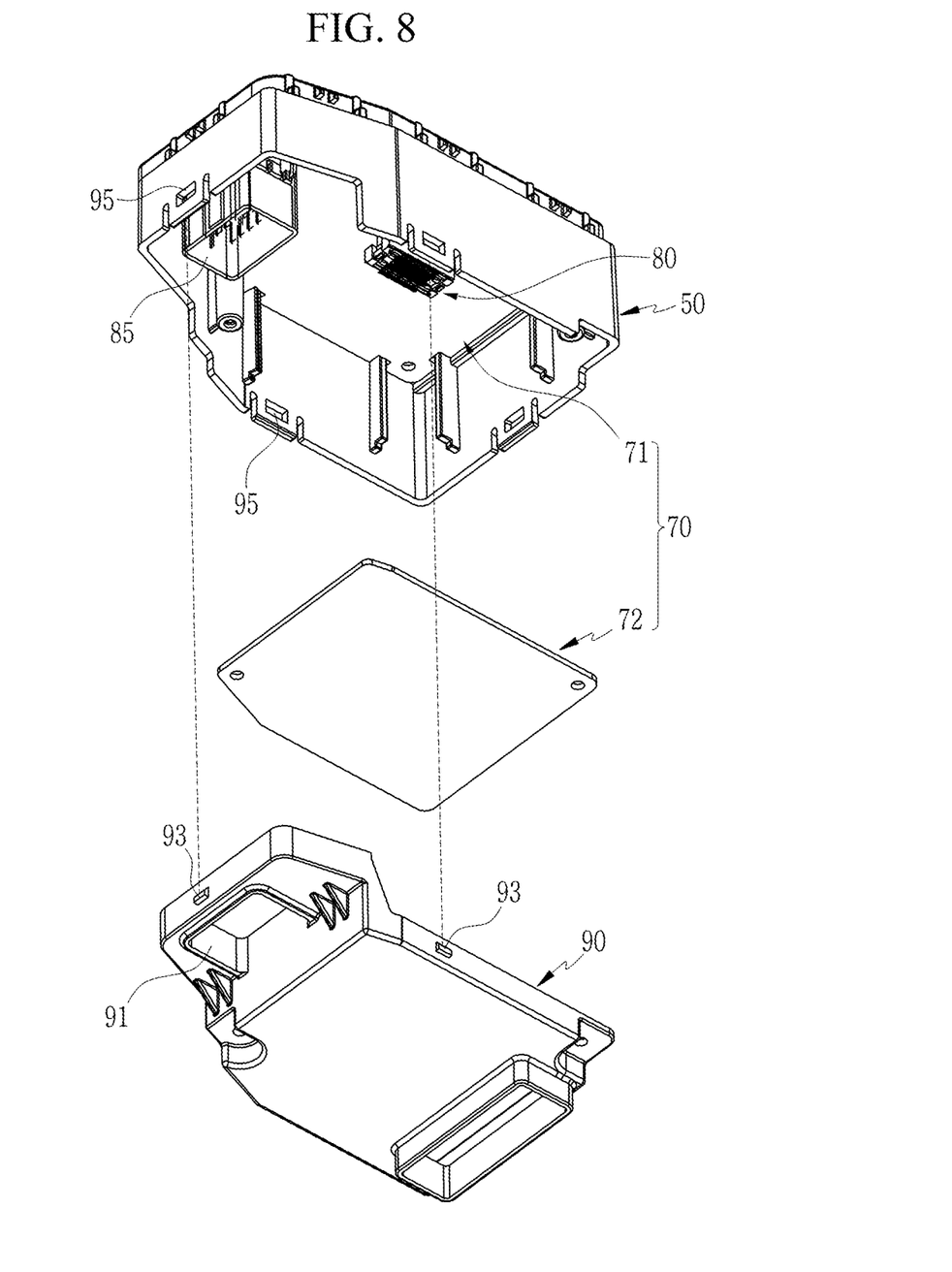
FIG. 8 is a perspective view of a middle housing and a lower cover applied to a shift by wire system according to various exemplary embodiments of the present invention.

The lower cover 90 is hooked to the bottom portion of the middle housing 50. As shown in FIG. 8, a plurality of hook protrusions 93 is formed at the edge portion of the lower cover 90. Furthermore, a plurality of hook holes 95 coupled to hook protrusion 93 are formed at the lower edge portion of the middle housing 50.

Hereinafter, the operation of the SBW system 100 according to various exemplary embodiments of the present invention will be described.

In various exemplary embodiments of the present invention, the upper housing 11 with the control button 23 and the shifter controller 30, and the middle housing 50 with the actuator controller 70 are mounted, and the lower cover 90 is mounted to the middle housing 50.

The shifter controller 30 and the actuator controller 70 are provided in a single assembly of the upper housing 11 and the middle housing 50, and are connected to each other through the connector assembly 80.

If the control button 23 is operated according to the driver's willingness to shift, an electrical manipulation signal is generated according to the manipulation to shift, and the electrical manipulation signal is output to the shifter controller 30.

Accordingly, the shifter controller 30 acquires the electrical manipulation signal input through the control button 23 and transmits shift information according to the electrical manipulation signal to the actuator controller 70.

The actuator controller 70 acquires the shift information transmitted from the shifter controller 30 and applies a drive signal according to the shift information to actuator 1 through the connection cable 83.

Accordingly, in various exemplary embodiments of the present invention, the actuator 1 is driven by the drive signal, and the transmission may be shifted by rotating the manual shaft by a rotation of the output axis of the actuator 1.

According to the SBW system 100 according to various exemplary embodiments of the present invention, by integrating the shifter controller 30 and the actuator controller 70 into a single assembly of the upper housing 11 and middle housing 50, the entire system may be compactly implemented, and the number of parts and weight may be reduced.

According to the SBW system 100 according to various exemplary embodiments of the present invention, potential failure causes such as wire breakage due to external environmental conditions and blocking communication between controllers may be eliminated.

Furthermore, in various exemplary embodiments of the present invention, by deleting the hard wire connecting the controllers as in the related art, it is possible to expect an effect of improving responsiveness between controllers and suppress the generation of electromagnetic waves.

Figure 9:
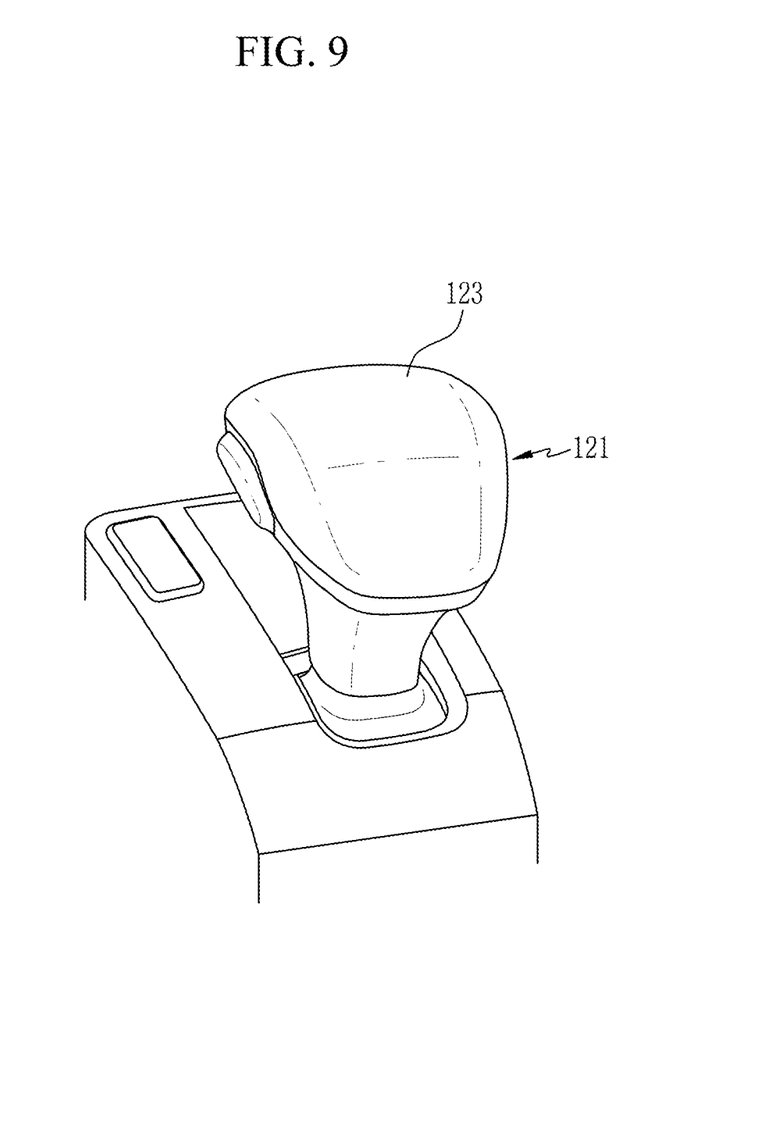
FIG. 9 is a drawing showing an exemplary variation of a control panel applied to a shift by wire system according to various exemplary embodiments of the present invention.

Meanwhile, in the SBW system 100 according to various exemplary embodiments of the present invention, a gear knob 123 may be included as a control panel 121 according to an exemplary variation as shown in FIG. 9. The gear knob 123 can generate a manipulation signal according to the position of the control lever.

Figure 10:
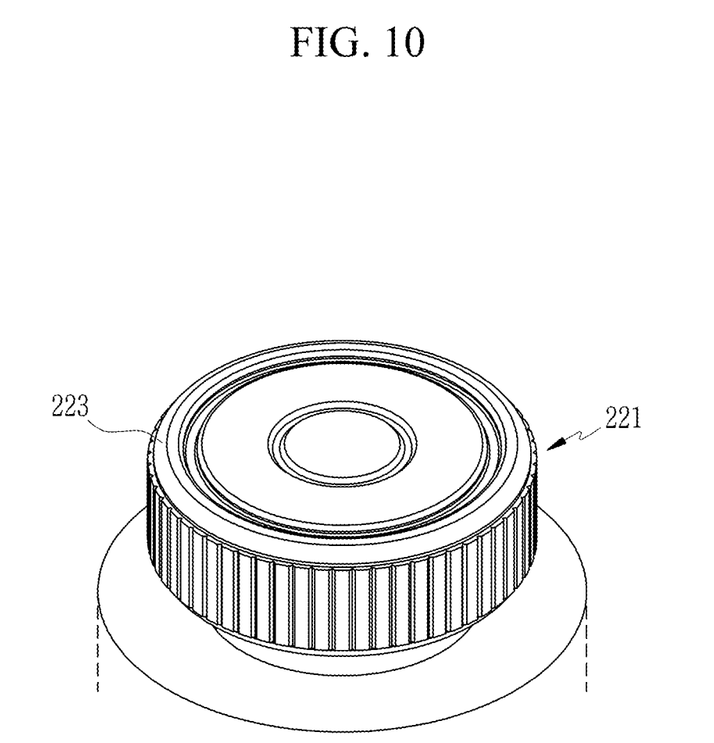
FIG. 10 is a drawing showing another exemplary variation of a control panel applied to a shift by wire system according to various exemplary embodiments of the present invention.

On the other hand, the SBW system 100 according to various exemplary embodiments of the present invention may include a rotation knob 223 as a control panel 221 according to an exemplary variation as shown in FIG. 10. The rotation knob 223 can generate a manipulation signal according to the rotation position of the knob.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift by wire system comprising:
   an upper housing;
   a control panel which is coupled to an upper portion of the upper housing and is configured to generate an electrical manipulation signal according to a driver's shifting operation;
   a shifter controller provided inside the upper housing and configured to transmit shift information according to the electrical manipulation signal;
   a middle housing coupled to a lower portion of the upper housing through an upper portion of the middle housing;
   an actuator controller which is connected to the shifter controller inside the middle housing and is configured to apply a driving signal according to the shift information to an actuator; and
   a lower cover coupled to a lower portion of the middle housing,
   wherein a plurality of connection protrusions is formed at an upper edge portion of the middle housing,
   wherein in a lower edge portion of the upper housing, a plurality of connection holes into which the plurality of connection protrusions is coupled is formed, and
   wherein the upper housing and the middle housing are provided as a single assembly combined with each other.

2. The shift by wire system of claim 1, wherein the shifter controller is connected to an internal portion of the upper housing through a connecting bracket.

3. The shift by wire system of claim 1,
   wherein the middle housing includes a closed upper portion and an open lower portion; and
   wherein the shifter controller is connected to the actuator controller through a connector assembly that passes through the middle housing.

4. The shift by wire system of claim 3,
   wherein the connector assembly includes a first connector and a second connector, and
   wherein the actuator controller includes a first control board connected to the shifter controller through the first connector penetrating the middle housing, and a second control board connected to the first control board through the second connector.

5. The shift by wire system of claim 1, wherein the actuator controller includes:
   a first control board connected to the shifter controller through a first connector penetrating the middle housing; and
   a second control board connected to the first control board through a second connector.

6. The shift by wire system of claim 5, wherein in an internal portion of the middle housing,
   a plurality of connecting ribs fitted into a plurality of connecting grooves provided in an edge portion of the first control board is formed; and
   a plurality of connecting boss coupled with the second control board is formed.

7. The shift by wire system of claim 5, wherein the first control board is provided with a connection socket which is configured to be electrically connected to the actuator.

8. The shift by wire system of claim 7,
   wherein the lower cover has a cover hole connected to the connection socket;
   wherein the connection socket is connected to a connection cable through the cover hole; and
   wherein the connection cable is connected to the actuator.

9. The shift by wire system of claim 1,
wherein a plurality of hook protrusions is formed at an edge portion of the lower cover; and
wherein in a lower edge portion of the middle housing, a plurality of hook holes that is coupled to the plurality of hook protrusions is formed.

10. The shift by wire system of claim 1, wherein the control panel includes a plurality of control buttons.

11. The shift by wire system of claim 1, wherein the control panel includes a gear knob.

12. The shift by wire system of claim 1, wherein the control panel includes a rotation knob.

* * * * *